UNITED STATES PATENT OFFICE.

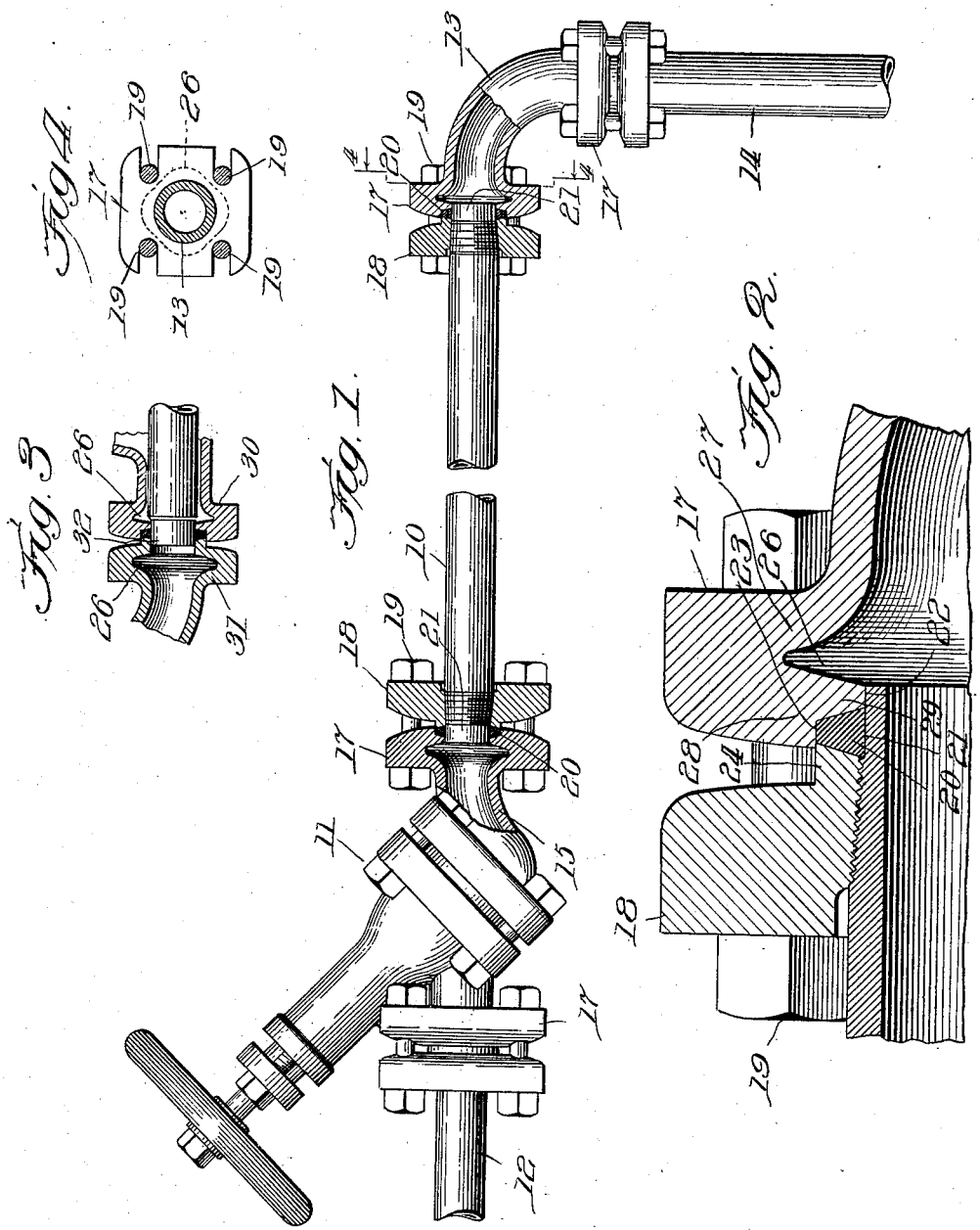

EUGENE F. OSBORNE, OF CHICAGO, ILLINOIS, ASSIGNOR TO OSBORNE STEAM ENGINEERING COMPANY, OF CHICAGO, ILLINOIS, A CORPORATION OF ILLINOIS.

FLANGED FITTING END.

977,032. Specification of Letters Patent. Patented Nov. 29, 1910.

Application filed July 23, 1909. Serial No. 509,109.

*To all whom it may concern:*

Be it known that I, EUGENE F. OSBORNE, a citizen of the United States, and a resident of Chicago, in the county of Cook and State of Illinois, have invented certain new and useful Improvements in Flanged Fitting Ends; and I do hereby declare that the following is a full, clear, and exact description thereof, reference being had to the accompanying drawings, and to the letters of reference marked thereon, which form a part of this specification.

This invention relates to improvements in the manner of making flanged fittings for high pressure joints for piping wherein the fitting members are provided with flanges which coöperate with bolts or other clamping devices which draw together the companion members of the joint in a manner to compress the packing medium between them.

Among the objects of the invention is to avoid the loss of castings by reason of cracking or breaking thereof at the junction of the flanges with the relatively lighter bodies of the fittings, due to irregular cooling of the inner and outer sides of the castings at this point, and to effect a saving of metal used in the fittings and thereby greatly decrease the cost of the fittings without in any way impairing their strength or efficiency.

The invention consists in the matters hereinafter set forth and more particularly pointed out in the appended claims.

In the drawings, Figure 1 is a view partially in section and partially in elevation of a pipe and two connected fittings, one being a valve and the other an elbow fitting. Fig. 2 is an enlarged fragmentary detail of one of the fittings, showing the temperature equalizing space in the flange thereof. Fig. 3 is a detail illustrating the application of the invention to the flanged connecting ends of a double and a single return-bend fitting adapted for use in a condenser or like construction. Fig. 4 is a cross section on the line 4—4 of Fig. 1.

The pipe 10 shown in Fig. 1 is connected, through a valve 11, of any suitable form, with a pipe 12, and, through an elbow fitting 13, with a pipe 14. So far as the present invention is concerned the joint between the flanged branches 15 of the valve and the flanged ends of the elbow are identical, and a description of one serves for both. The said elbow and valve are provided at their connections with the pipe 10, as well as with the pipes 14 and 12 respectively, with heavy flanges 17 through which, and flanges 18, 18, surrounding the ends of the pipe 10, extend clamping bolts 19, 19 by which the flanged joint members are drawn together to compress the packing rings 20 that are interposed between said joint members. As herein shown the pipe 10 has at its ends tapered screw threads that engage interior tapered screw-threads in the openings of the flanges 18, and is reduced at its ends beyond its screw-threaded portions to provide cylindric extensions 21, 21 which fit closely in cylindric bores 22, 22 in the flanges of the fittings 11 and 13. In the present construction the packing rings 20 surround and fit closely about the reduced extensions 21 of the pipe, and are contained in recesses 23 formed in the flanges 17 just outside the bores 22. The packing rings are compressed in said recesses by followers 24 of the flanges 18 that enter the recesses. In the present instance the packing rings 20 are tapered or made conical at their ends to fit the corresponding tapered bottom faces of the recesses 23 and the end faces of the followers 24.

The fittings described, and others of a generally similar character, have been designed for use in piping carrying high pressure fluid, such, for instance, as superheated steam, ammonia and carbon dioxid, and it is essential that the flanges of the fittings be made strong and relatively massive in order to withstand the strain necessary to bring the proper packing pressure on the joint making devices, as the packing rings 20. It has been found in practice that the mass of metal required in the flanges, relatively to that required in the fitting walls, is so great that the unequal cooling of the metal at the interior and exterior sides of the walls and flanges in the molding operation tends to and does break or crack the castings at the junction of the walls and flanges; and this is particularly true when the castings are made of a high fusing metal, such as cast steel. In order to avoid the loss of castings due to this cause, it has heretofore been found necessary in the manufacture of these fittings to make the walls of the fittings of much greater thickness than required to withstand the pressure of the fluid which they carry, with a result of greatly increasing the weight and cost of the castings. The alternative of making the fitting walls of a thickness only to withstand the pressure of the fluid carried by the piping results in scrapping a substantial percentage of the castings due to the imperfections referred to, thus increasing the aggregate cost of the fittings. In order to avoid these difficulties, I propose to so cast the flanged fittings as to provide within the flange a temperature equalizing space or recess 26, which is arranged to carry or transmit the cooling effect during the cooling of the casting in the mold to a substantial distance into the flange in such manner that the cooling effect is more nearly equalized at the interior and exterior angles of the flange and fitting wall as compared to prior practice. This recess is shown as located between the fluid thoroughfare of the fitting and the packing joint formed in part by the packing ring 20, and is extended radially outwardly a substantial distance into the metal of the flange. The part 27 of the flange at the base of the fitting wall is gradually increased in thickness as it approaches the outer sides of said recess, thereby effecting a gradual and equalized cooling of the part 27 of the flange. The same is true with respect to the part 28 of the flange between said recess and the outer end of the flange. The cooling of the metal of the flange and fitting wall is thereby rendered more nearly uniform than under prior practice and the contracting effect on the metal of the casting is correspondingly equalized. Between said recess 26 and the packing ring recess 23 is provided an annular flange or abutment 29 which constitutes the bottom of the packing ring recess, and which is of ample strength to resist the packing pressure brought on the flanged fitting.

It has been found that the provision of the temperature equalizing space 26, arranged as described, permits a reduction of thickness of the wall of the fitting of at least twenty per cent. In other words the thickness of the fitting wall may be calculated more nearly upon the pressure which the fitting is designed to carry, and thereby avoid an overweight of the casting which has heretofore been necessary to prevent cracking of the casting at the junction of the flange and wall, due to the unequal cooling of the casting at this point.

In Fig. 3 I have shown my invention as adapted to the flange fittings of a combined single and return-bend fitting adapted for use, for instance in a condenser or like structure, such as is shown in my pending application for United States Letters Patent, filed on the 16th day of August 1909, Serial Number 512,995. As shown in said figure, 30 designates one flanged end of a double return-bend fitting and 31 the corresponding flanged end of a single return-bend fitting the said fittings being bored to receive the reduced end 32 of the pipe 33 which constitutes one passage of the condenser. In this construction both flanges of the fittings 30 and 31 are provided with the temperature equalizing spaces 26 for the same purpose as described in connection with Figs. 1 and 2. The said spaces 26 may be carried somewhat farther into the flanges between the bolts 19 than in the parts of the flanges directly between said bolts and the openings in the fittings which receive the pipe 10 or other tubular member, as indicated by the dotted outline of said space in Fig. 4. A further advantage of the provision of the space 26 in the flange is that the part 28 of the metal of the flange, which is under compression through the action of the bolts 19, is thereby pressed into closer fitting relation to the end of the pipe which enters the bore of the fitting, whereby an efficient metal to metal joint between the pipe and fitting is brought about.

It will be understood that the improvements herein described may be equally well adapted to fittings of other form than herein shown, as for instance, they may be adapted to two flanged parts or members which are bolted or otherwise secured together to form the casing of a valve or like fitting. The invention is not limited therefore to the structural details illustrated except as hereinafter made the subject of specific claims.

I claim as my invention:

1. A hollow fitting for high pressure joints and the like, provided around the opening thereof with a flange by which the fitting is connected to another part, the fitting being formed at the junction of the flange with the fitting wall with an interior temperature equalizing space which extends a substantial distance radially into the flange, for the purpose set forth.

2. A hollow fitting for high pressure joints provided around the opening thereof with a flange by which the fitting is connected to another part, the fitting being formed at the junction of the flange with the fitting wall with an interior temperature equalizing space which extends a substantial distance radially into the flange, the fitting wall being gradually increased in thickness at the point where it merges into the flange, for the purpose set forth.

3. A fitting for high pressure joints, having an opening to receive a tubular member constituting part of the fluid passage and provided around said opening with a flange arranged to constitute part of a joint between said fitting and tubular member, the fitting being formed at the junction of the flange with the fitting wall with an interior temperature equalizing space which extends a substantial distance radially into the flange for the purpose set forth.

4. A fitting for high pressure joints having an opening to receive a tubular member constituting part of the fluid passage and provided around said opening with a flange arranged to constitute part of a joint between said fitting and said tubular member, the fitting being formed at the junction of the flange with the fitting wall with an interior, annular temperature equalizing space which extends a substantial distance radially into the flange and provided between said space and the end of the fitting with an annular packing supporting flange or abutment.

5. A fitting for high pressure joints having an opening to receive a tubular member constituting part of the fluid conduit, and provided around said opening with a flange arranged to constitute part of a joint between said fitting and said tubular member, the fitting being formed with an interior annular temperature equalizing space which extends into the flange radially beyond the junction of the wall of the fitting with said flange and the fitting being formed with a fillet at the interior angle between said wall and flange.

6. In a high pressure joint, the combination with a hollow fitting provided with an opening to receive a tubular member constituting part of the fluid passage and with a flange surrounding said opening, of a tubular member entering said opening and provided with a flange opposing the fitting flange, and a packing ring surrounding said tubular member and arranged to be compressed between said flanges, the fitting being provided at the junction of the fitting wall and its flange with an annular temperature equalizing space which extends a substantial distance radially into said flange and exterior to said flange with an annular abutment for the packing ring.

In testimony, that I claim the foregoing as my invention I affix my signature in the presence of two witnesses, this 19th day of July A. D. 1909.

EUGENE F. OSBORNE.

Witnesses:
W. L. HALL,
WILLIAM GOLDBERGER.